(12) United States Patent
Greene

(10) Patent No.: US 12,739,029 B2
(45) Date of Patent: Sep. 15, 2026

(54) SYSTEMS AND METHODS FOR FIBER ASSET MANAGEMENT

(71) Applicant: Level 3 Communications, LLC, Denver, CO (US)

(72) Inventor: Brian Greene, Loveland, CO (US)

(73) Assignee: Level 3 Communications, LLC, Denver, CO (US)

( * ) Notice: Subject to any disclaimer, the term of this patent is extended or adjusted under 35 U.S.C. 154(b) by 107 days.

(21) Appl. No.: 19/034,512

(22) Filed: Jan. 22, 2025

(65) Prior Publication Data

US 2026/0088896 A1 Mar. 26, 2026

Related U.S. Application Data

(60) Provisional application No. 63/698,237, filed on Sep. 24, 2024.

(51) Int. Cl.
*H04B 10/071* (2013.01)
*H04L 9/00* (2022.01)

(52) U.S. Cl.
CPC ............ *H04B 10/071* (2013.01); *H04L 9/50* (2022.05)

(58) Field of Classification Search
CPC ................................ H04B 10/071; H04L 9/50
See application file for complete search history.

(56) References Cited

U.S. PATENT DOCUMENTS

2024/0202849 A1* 6/2024 Kawaguchi .......... G06Q 50/184

* cited by examiner

*Primary Examiner* — Maurice C Smith

(57) ABSTRACT

Disclosed are systems and methods that provide a decision-intelligence (DI)-based, computerized framework for automatically and dynamically managing fiber assets within a distributed ledger. The framework operates via predicted insights into how a fiber optic network, inclusive of the fiber assets as a whole and/or individualized, can be optimized to provide accurate, efficient and/or reliable network facilities for associated entities. OTDR data can be utilized by the framework to perform maintenance, troubleshooting and/or to ensure the network operates efficiently. Accordingly the framework can operate to manage, analyze and utilize such forms and/or types of data to curate computerized fiber optic solutions for the fiber optic networks and/or the entities that are operating therefrom, which can be effectuated via the implementation of the disclosed systems and methods within a fiber optics network infrastructure.

20 Claims, 8 Drawing Sheets

| | Event (13) | Distance (km) | Attenuation (dB) | Reflectance (dB) | Slope (dB/km) | Rel. dist. (km) | Link budget (dB) |
|---|---|---|---|---|---|---|---|
| 1 | | 0.000 00 | 0.534 | −52.39 | 0.200 | 3.682 82 | |
| 2 | | 2.072 58 | −0.038 | | 0.198 | 2.072 58 | 0.944 |
| 3 | | 4.101 04 | 0.076 | | 0.190 | 2.028 46 | 1.291 |
| 4 | | 6.151 88 | 0.007 | | 0.196 | 2.050 84 | 1.768 |
| 5 | | 6.825 91 | −0.094 | | 0.203 | 0.674 02 | 1.912 |
| 6 | | 8.832 62 | 0.004 | | 0.191 | 2.006 72 | 2.202 |
| 7 | | 10.964 04 | −0.034 | | 0.194 | 2.131 42 | 2.619 |
| 8 | | 12.948 37 | 0.029 | | 0.192 | 1.984 33 | 2.966 |
| 9 | | 14.829 75 | 0.025 | | 0.190 | 1.881 38 | 3.353 |
| 10 | | 16.652 93 | 0.362 | | 0.184 | 1.823 18 | 3.714 |
| 11 | | 18.718 48 | −0.062 | | 0.190 | 2.065 55 | 4.468 |
| 12 | | 19.611 85 | | −53.69 | 0.187 | 0.893 37 | 4.574 |
| 13 | | 23.407 22 | | | 0.193 | 3.795 37 | 5.484 |

denotes a connector interface at the start or end of a launch or tail lead denotes a fusion splice (non-reflective loss event) in the link under test denotes a connector (reflective loss event) in the link under test denotes the end of the fibre under test (when the tail lead has not been used)

FIG. 4

SYSTEMS AND METHODS FOR FIBER ASSET MANAGEMENT

CROSS-REFERENCE TO RELATED APPLICATIONS

This application claims the benefit of priority from U.S. Provisional Patent Application No. 63/698,237, filed Sep. 24, 2024, whereby the contents of which are incorporated by reference herein in their entirety.

FIELD OF THE DISCLOSURE

The present disclosure relates to asset management via a distributed ledger, and more particularly, to a decision intelligence (DI)-based computerized framework for automatically and dynamically managing fiber assets within a distributed ledger.

SUMMARY OF THE DISCLOSURE

A fiber optic network is a telecommunications system that utilizes thin strands of glass and/or plastic, known as optical fibers, to transmit data as light signals. Such fibers are bundled together to form cables, capable of transmitting vast amounts of information over long distances at incredibly high speeds. Unlike traditional copper wires, which rely on electrical signals, fiber optics use light pulses, allowing for significantly higher bandwidth and faster data transfer. The network's structure typically includes core and access layers, with the core serving as the backbone for high-capacity data transmission, while the access layer connects users to the network. Fiber optic networks are highly efficient, resistant to electromagnetic interference, and can support a wide range of services, including internet, television, and telephone communications, making them ideal for modern digital infrastructure.

Currently, there are significant technical uncertainties that many conventional fiber optic networks face, which are centered around durability, environmental impacts and technological influence. For example, a fiber optic network provider, and/or an entity that operates therefrom, needs to understand the lifespan of such fiber assets to conduct their business. In another example, such entities, inclusive of the network providers, need to understand the environmental effects of a geographical location for strategic deployment and maintenance. And, in another non-limiting example, an understanding of how certain technologies (e.g., Raman pumps, for example) can impact the lifespan of fiber optics can be utilized for network optimization.

To that end, the disclosed systems and methods provide a computerized framework that can dynamically determine and/or predict, and thereby provide insights into how a fiber optic network, inclusive of the fiber assets as a whole and/or individualized, can be optimized to provide accurate, efficient and/or reliable network facilities for contracting entities.

According to some embodiments, the disclosed framework can operate to identify and evaluate Optical Time-Domain Reflectometer (OTDR) data, whereby determinations for fiber assets, as well as other impact assets and/or locations, can be securely stored (e.g., in a distributed ledger, as discussed infra). As discussed herein, OTDR data (captured in an. SOR file format (Standard OTDR Record), as discussed below) is crucial in fiber optic networks for assessing the integrity and performance of fiber optic cables. OTDRs operate by sending a series of light pulses down the fiber and measuring the reflected signals to detect issues along the cable, such as breaks, bends, or splice losses. The data collected provides a graphical representation, called a trace, showing the distance and magnitude of these issues.

For example, in some embodiments, as discussed herein, such data can be utilized by the disclosed framework to pinpoint the exact location of faults, assess the quality of splices and connectors, and verify that newly installed cables meet performance specifications, inter alia. Moreover, OTDRs can be utilized to perform maintenance, troubleshooting and/or ensuring the network operates efficiently. OTDR data can be valuable in long-distance networks, as it helps detect issues without needing direct access to the entire cable length, reducing the time and cost associated with network repairs and optimization.

Accordingly, as discussed herein, the framework can operate to manage, analyze and utilize such forms and/or types of data to curate computerized fiber optic solutions for the fiber optic networks and/or the entities that are operating therefrom. For example, outside plant (OSP) management, deployment of applications (e.g., Web3 applications, for example), and the like, can be effectuated via the implementation of the disclosed systems and methods within a fiber optics network infrastructure, as discussed herein. Thus, as provided herein, the disclosed framework provides a novel, artificial intelligence (AI), machine learning (ML) and/or large language model (LLM)—based approach for managing networks and/or network layers for purposes of maintaining their integrity and/or usage by the network service provider(s) and/or third party entities.

According to some embodiments, a method is disclosed for a DI-based computerized framework for automatically and dynamically managing fiber assets within a distributed ledger. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for automatically and dynamically managing fiber assets within a distributed ledger.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 depicts a non-limiting example embodiments according to some embodiments of the present disclosure;

DETAILED DESCRIPTION

Figure 1:
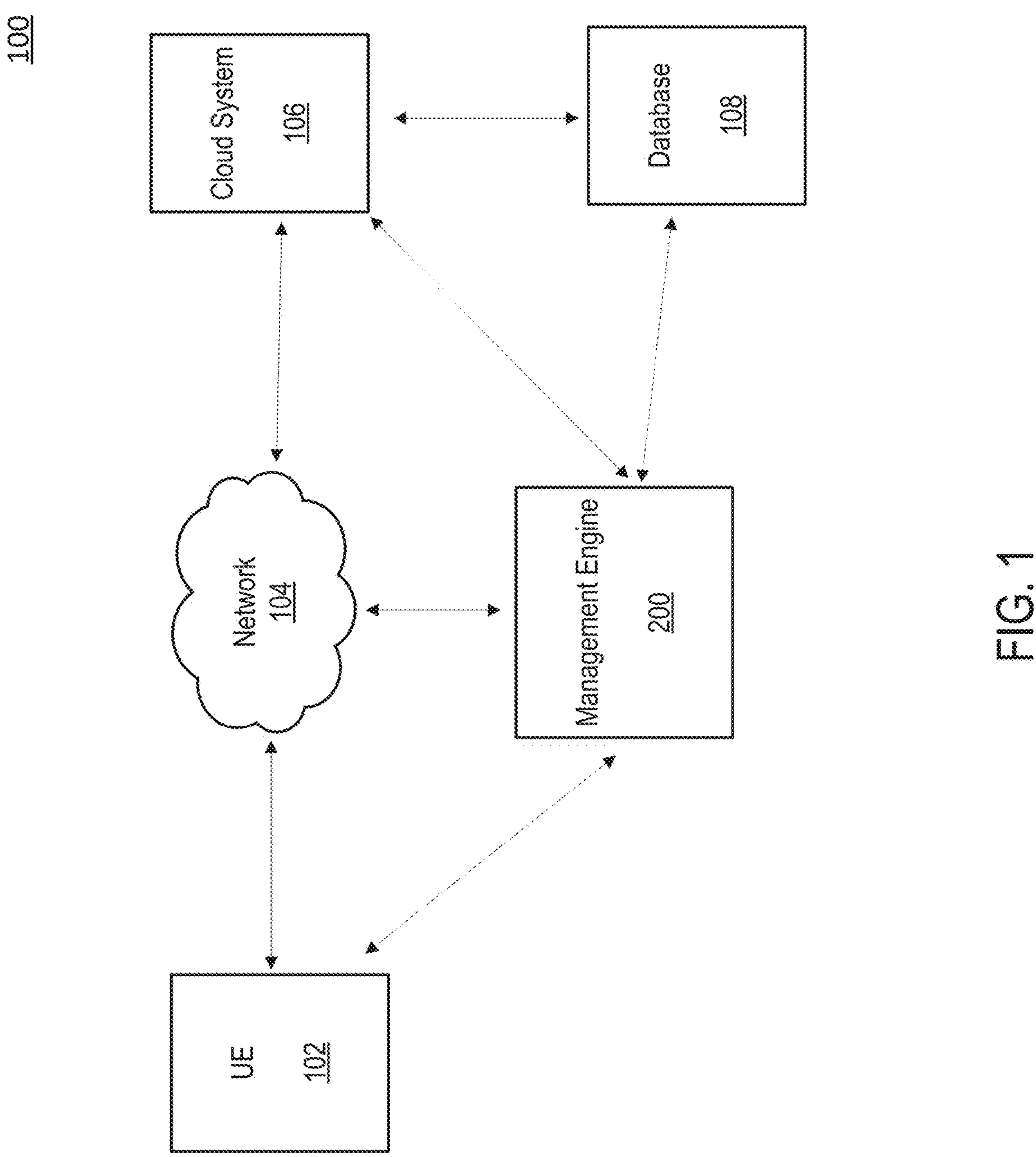
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub- networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, 4$^{th}$ or 5$^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. As discussed above,. SOR data refers to the information contained in a. SOR file that was generated by an OTDR during testing and/or operation of fiber assets in a fiber optic network. Such files can include detailed measurements and reflections along the fiber link, and can include key data points such as, for example, fiber length, attenuation (e.g., signal loss along the cable due to factors like splicing, bending, poor connections and the like), reflection points (e.g., locations where light reflects back, indicating splices, connectors, faults, and the like), events (e.g., specific points along the fiber where significant changes occur, such as splices, connectors, breaks, and the like), and the like, or some combination therefrom. In some embodiments, such data can be represented as a trace, a graphical representation of the fiber's performance, and can be used to analyze the cable's condition.

Conventional mechanisms for performing fiber optic data management are limited to a fiber quality assurance (FQA) process, which involves the validation of a single file, represented as a single point in time. This, among other technical shortcomings, is prohibitive of predictive or forward looking insights that can be leveraged for the long-term performance and health of a network's fiber assets.

The disclosed systems and methods address such shortcomings, among others, via enhanced, blockchain-based OTDR monitoring and predictive analysis based therefrom, as discussed herein. According to some embodiments, as discussed in more detail below, capturing OTDR data (in .SOR file structures) in a fiber optic network provides critical insights into the network's current performance and can be used to predict its long-term stability and the health of each fiber asset. In some embodiments, such operational capabilities and/or functionality can be achieved through network analysis and stability predictions that can be based on, but not limited to, initial benchmarking, periodic testing, and historical trend analysis, and the like, or some combination thereof.

For example, in some embodiments, as related to benchmarking and baseline creation, when a fiber optic network is first installed, OTDR data can be captured to establish a baseline of the network's condition, including the attenuation levels, splice losses, connector quality, and overall fiber length. This initial data serves as a reference point for future comparisons.

Further, in some embodiments, by periodically capturing OTDR data, the disclosed framework can track changes over time, identifying trends in the fiber's performance. Deterioration in the fiber's signal quality, such as increasing attenuation, can indicate emerging problems like fiber aging, environmental stress, or mechanical damage.

Moreover, in some embodiments, the disclosed framework can perform event and fault detection. That is, for example, OTDR data helps detect faults such as bends, breaks, and poor splices early. By comparing historical OTDR results, the framework can identify patterns of recurring issues in certain sections of the network, allowing proactive measures to be determined and/or implemented before such faults cause significant network outages.

Accordingly, in some embodiments, analysis of OTDR data over time helps predict future failures by identifying gradual degradation, such as increasing attenuation at specific points or worsening reflections at connectors. This allows for the proactive scheduling of maintenance and/or performance of repair activities before critical failures occur, which can reduce downtime and costs associated with emergency repairs.

Additionally, the disclosed framework can collect OTDR data (e.g., periodically, according to a criteria and/or continuously, as discussed infra), whereby a comprehensive record of the network's performance can be compiled and stored in a distributed leger (e.g., blockchain). As provided below, analyzing such stored data can aid in identifying factors that may contribute to fiber degradation, such as environmental conditions (e.g., temperature fluctuations, moisture) or mechanical stress (e.g., construction, vibration), which can enable (or provide functionality for) operations and/or operators to mitigate risks and improve the resilience of the network.

Thus, as discussed herein, according to some embodiments, the OTDR data plays a critical role in not only diagnosing immediate network issues but also in providing insights into the long-term stability and reliability of the fiber optic infrastructure. The disclosed systems and methods provide such capabilities and functionalities through regular monitoring and analysis of such data, whereby informed decisions on maintenance, asset replacement, and network upgrades can be made and implemented to ensure the ongoing health and performance of the fiber optic network With reference to FIG. 1, system 100 is depicted which includes user equipment (UE) 102 (e.g., a client device, as mentioned above and discussed below in relation to FIG. 7), network 104, cloud system 106, database 108, and management engine 200. It should be understood that while system 100 is depicted as including such components, it should not be construed as limiting, as one of ordinary skill in the art would readily understand that varying numbers of UEs, peripheral devices, cloud systems, databases, network resources, engines and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, Internet of Things (IoT) device, autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a network platform (e.g., Lumen® Technologies, for example), which has associated network resources hosted on the internet or private network (e.g., network 104), which enables (via engine 200) the functionality and capabilities discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE, and the services and applications provided by cloud system 106 and/or management engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
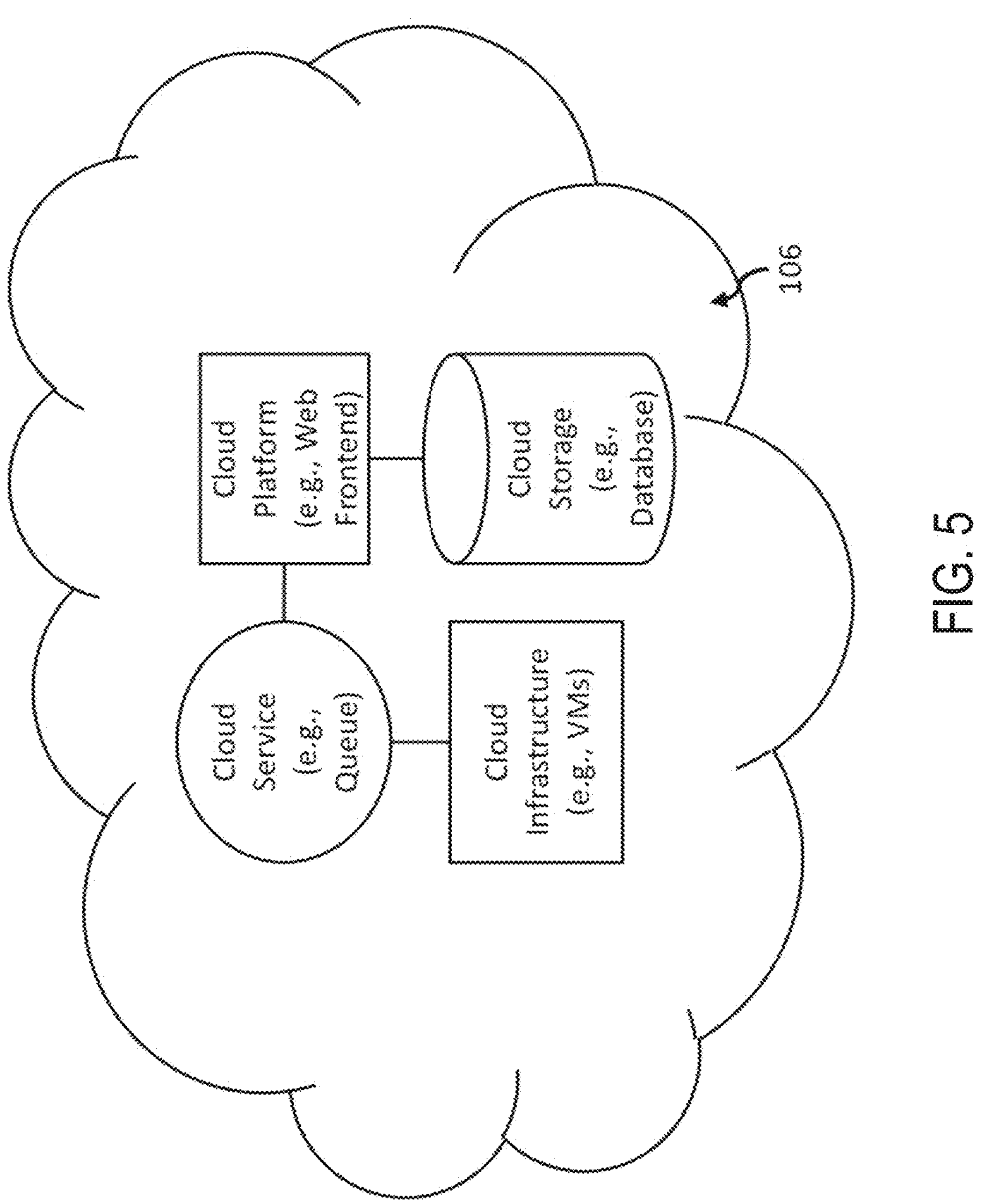
FIG. 5 depicts an exemplary implementation of an architecture according to some embodiments of the present disclosure.
Figure 6:
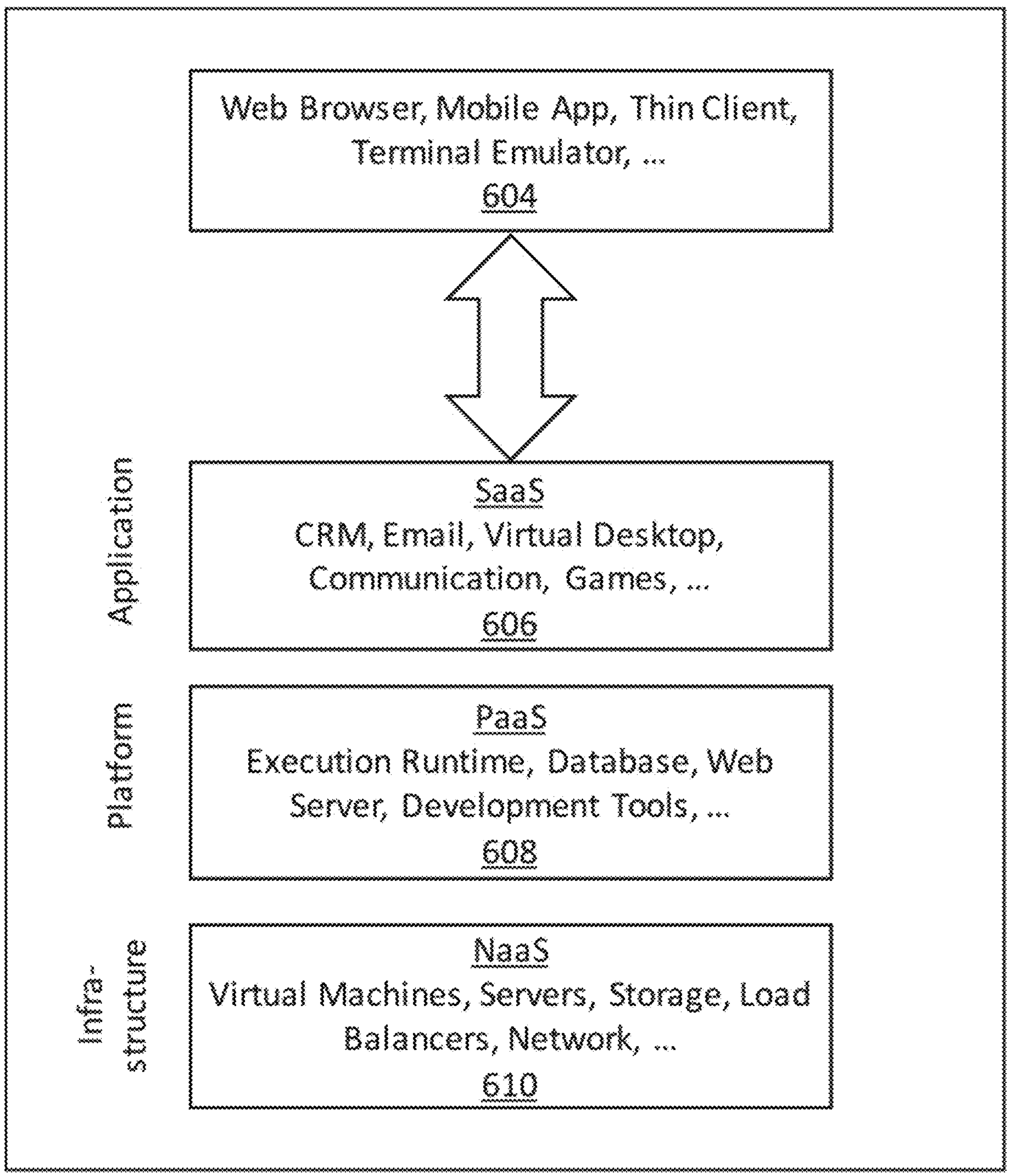
FIG. 6 depicts an exemplary implementation of an architecture according to some embodiments of the present disclosure.

Turning to FIG. 5 and FIG. 6, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: network as a service (NaaS) 610, platform as a service (PaaS) 608, and/or software as a service (SaaS) 606 using a web browser, mobile app, thin client, terminal emulator or other endpoint 604. In some embodiments, as understood by those of skill in the art, an infrastructure as a service (IaaS) can be implemented—for example, as part of and/or in addition to SaaS 606, PaaS 608 and/or NaaS 610. FIG. 5 and FIG. 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

According to some embodiments, database 108 may correspond to a distributed ledger of a distributed network. In some embodiments, the distributed network may include a plurality of distributed network nodes, where each distributed network node includes and/or corresponds to a computing device associated with at least one entity (e.g., the entity associated with cloud system 106, for example, discussed supra). In some embodiments, each distributed network node may include at least one distributed network data store configured to store distributed network-based data objects for at least one entity. For example, database 108 may correspond to a blockchain, where the distributed network-based data objects can include, but are not limited to, account information, medical information, entity identifying information, wallet information, device information, network information, credentials, security information, permissions, identifiers, smart contracts, transaction history, and the like, or any other type of known or to be known data/metadata related to an entity's and/or user's information, structure, business and/or legal demographics, inter alia.

In some embodiments, a blockchain may include one or more private and/or private-permissioned cryptographically-protected, distributed database, such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers, ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, exemplary distributed blockchain-type ledger implementations of the present disclosure with associated devices may be configured to affect transactions involving Bitcoins and other cryptocurrencies into one another and also into (or between) so-called FIAT money or FIAT currency, and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

Management engine 200, as discussed above and further below in more detail, can include components for the disclosed functionality. According to some embodiments, management engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, management engine 200 may be configured to implement and/or control a plurality of services and/or microservices, where each of the plurality of services/microservices are configured to execute a plurality of workflows associated with performing the disclosed search functionality. Non-limiting embodiments of such workflows are provided below in relation to at least FIGS. 3A-3B.

According to some embodiments, as discussed above, management engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
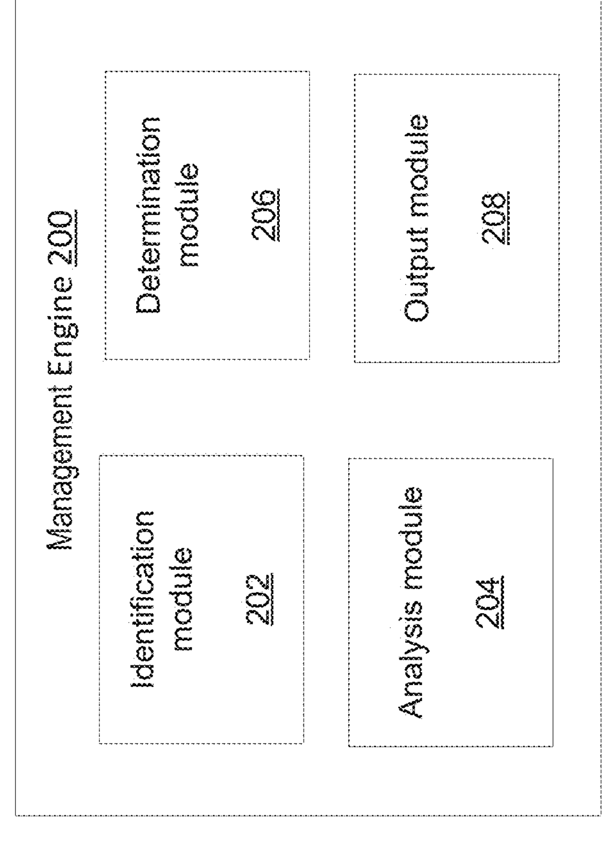
FIG. 2 is a block diagram illustrating components of an exemplary system according to some embodiments of the present disclosure.

As illustrated in FIG. 2, according to some embodiments, management engine 200 includes identification module 202, analysis module 204, determination module 206 and output module 206. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below. Management engine 200 or other device(s) running Process 300 may be operated entirely at the user device level, or with cloud support as a distributed system, or at a service provider's infrastructure, as non-limiting implementation examples. It will be understood that the disclosure herein provides for a configuration that is platform agnostic and may be operated on multiple alternative platforms as a matter of design choice using the teachings described.

Figure 3A:
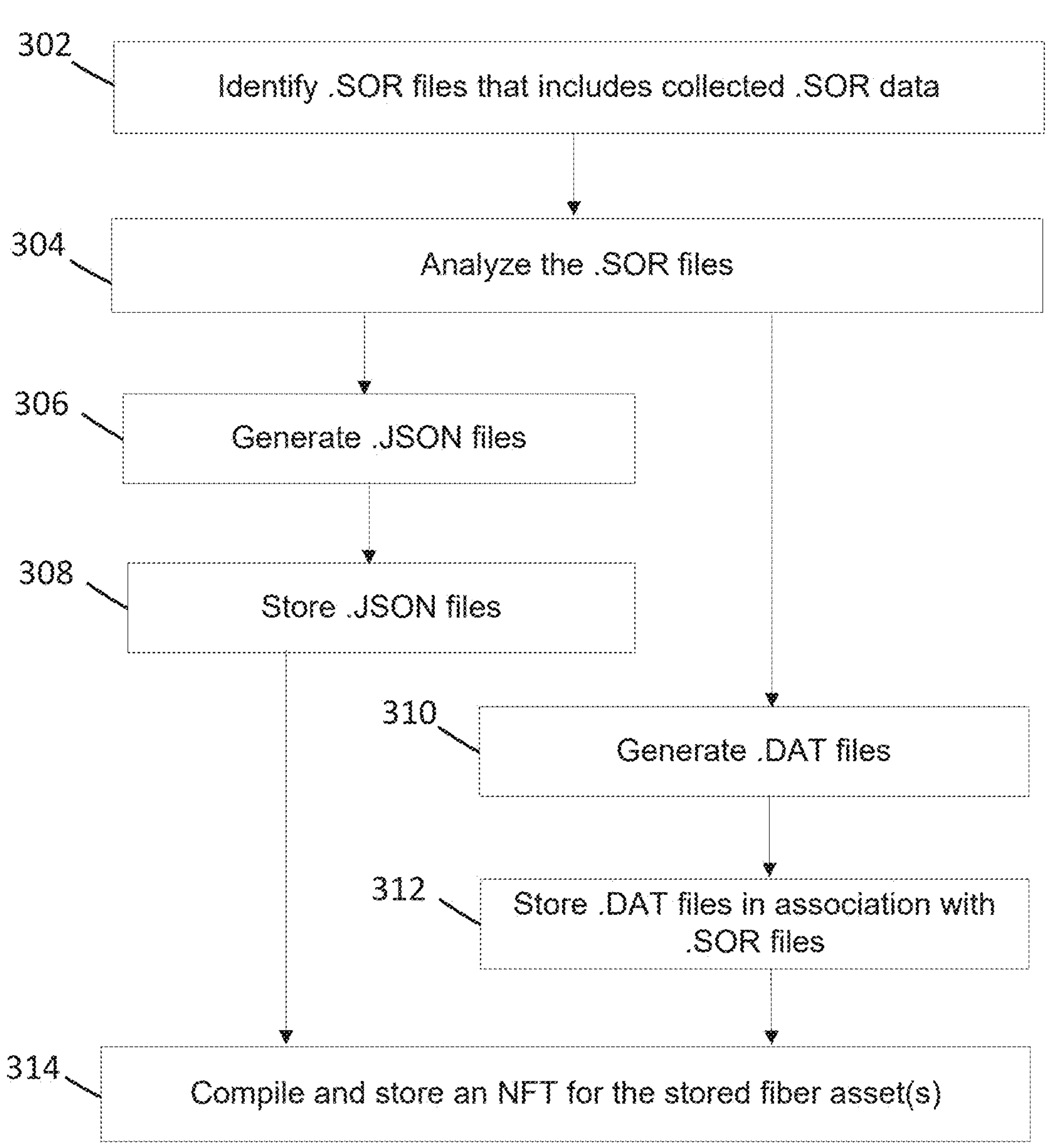
FIGS. 3A-3B illustrate exemplary workflows according to some embodiments of the present disclosure.
Figure 3B:
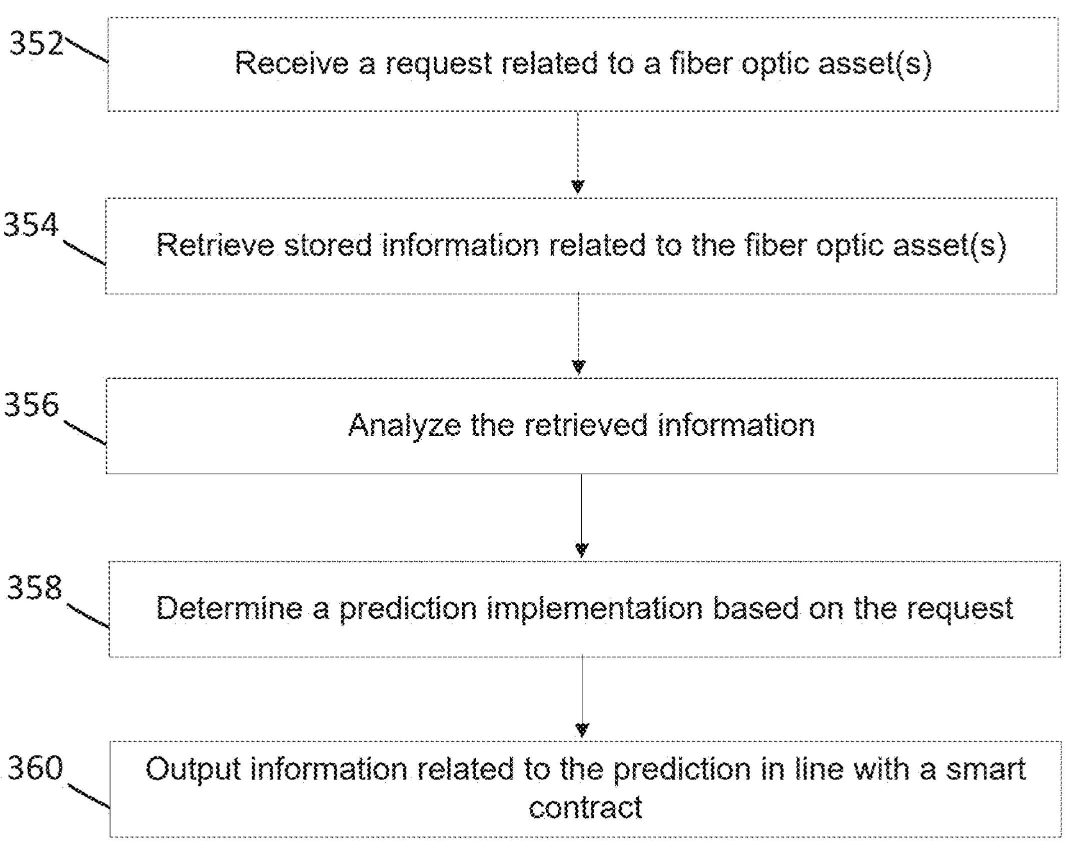

In FIG. 3A and FIG. 3B, Processes 300 and 350, respectively, provide non-limiting example embodiments for automatically and dynamically managing fiber assets within a distributed ledger. As provided below, the disclosed framework's configuration and implementation can provide a computerized suite of tools for providing advancements in how fiber assets are identified, managed, controlled and/or made available for usage and/or distribution among entities.

As provided herein, the Process 300 of FIG. 3A provides functionality related to non-limiting example embodiments for compiling and storing OTDR data for a set of fiber optic assets (e.g., a portion of a network's fiber optic cables and/or all of the cables, for example). Further, as discussed below, Process 350 of Process 3B provides example embodiments for utilizing such data to control, manage and/or operate functionality on/over the network based on predictions determined from the data compiled and stored from Process 300 of FIG. 3A.

Turning to FIG. 3A, according to some embodiments, Step 302 of Process 300 can be performed by identification module 202 of management engine 200; Step 304 can be performed by analysis module 204; Steps 306 and 310 can be performed by determination module 206; and Steps 308, 312 and 314 can be performed by output module 206.

According to some embodiments, Process 300 begins with Step 302 where engine 200 can identify a set of .SOR files. As discussed above, OTDRs can collect OTDR data, which can include .SOR data as part of .SOR files.

According to some embodiments, the .SOR files identified in Step 302 can correspond data collected during a time period, a criteria (e.g., time, date, request, and the like) in response to an event and/or some combination thereof, and/or can be specific a set of fiber assets, a geographic region, a specific supported entity (e.g., an entity subscriber to the network), a network hosted on the fiber assets, and the like, or some combination thereof. An example of .SOR data within an .SOR file is depicted in FIG. 4.

In some embodiments, the. SOR files identified in Step 302 can correspond to past collected OTDR data and/or currently collected OTDR data (e.g., data collected within the past n time frame). Thus, the OTDR data in the. SOR files can be real-time data, and/or data from a previous time period (that was stored in database 108, as discussed above).

In Step 304, engine 200 can analyze the identified. SOR files. As discussed herein, as a result of the analysis in Step 304, JavaScript Object Notation (.JSON) files can be generated, as in Step 306. In some embodiments, the .JSON files can be converted versions of the .SOR files; and in some embodiments, new files in .JSON file structure can be created.

In some embodiments, a .JSON file can be created for the set of .SOR files identified in Step 302; and in some embodiments, a .JSON file can be created respectively for each .SOR file.

In some embodiments, the generated .JSON files can include data and/or metadata from a corresponding. SOR file. By way of example, in some embodiments of Steps 304-306, engine 200 can parse a binary structure of a .SOR file, and based on a specification of the .SOR file, extract information from the header (e.g., test equipment, date, time), fiber length and data points, event data (e.g., splices, reflections, loss measurements, and the like), and links to an original .SOR data in the location of the identified .SOR file. Thus, for example, key information related to fiber length, attenuation, event points and test parameters (e.g., wavelength, pulse width and the like) can be stored extracted from the .SOR file and stored in structured format (e.g., in a Python dictionary/list, for example). Such structured format can then be converted into a .JSON file.

In Step 308, engine 200 can store the created. JSON files for each of the identified .SOR files in database 108. As discussed above, database 108 can be a distributed ledger (e.g., blockchain). Therefore, the core data related to the .SOR data in an .SOR file now can be stored in the blockchain as an .JSON file, thereby ensuring secure, immutable and transparent record-keeping of fiber data (for a set of fiber assets).

In Step 310, engine 200 can generate .DAT files, which can be based on the analysis of the .SOR files. In some embodiments, a .DAT file can be created for the set of .SOR files identified in Step 302; and in some embodiments, a .DAT file can be created respectively for each .SOR file.

According to some embodiments, engine 200 can, based on the analysis in Step 304 (which in some embodiments can be performed again for purposes of executing Steps 310-312), generate the .DAT files by parsing the data in the .SOR files and extracting information related to distance and power. In some embodiments, such extraction can be based on a distance/power format or specification within the .SOR file, such that the extracted data can evidence a long term expectancy of the collected .SOR data.

By way of example, according to some embodiments, in a .SOR file, distance data refers to the physical location along the fiber optic cable where measurements are taken. This data is critical for mapping the fiber's length and identifying specific points of interest, such as splices, connectors, bends, or faults. OTDR devices calculate distance by sending light pulses into the fiber and measuring the time it takes for the reflected signals to return, using the speed of light in the fiber medium to determine the exact location of events. This, for example, allows network engineers to pinpoint the location of any irregularities or issues within the fiber.

Power data in a .SOR file represents the strength of the optical signal measured as it returns to the OTDR device. As light travels through the fiber, some of the signal is naturally attenuated due to scattering and absorption. The power data provides insights into the signal loss along the fiber, indicating where significant losses occur and helping to detect issues like poor splicing, fiber breaks, or sharp bends.

Thus, by analyzing both distance and power data together, engine 200 can evaluate the overall health and efficiency of the fiber optic link, identify problem areas, and ensure the network operates effectively. Moreover, long-term expectancy of a fiber optic network can be determined by analyzing distance and power data over time, which can be compiled within the generated. DAT file(s) in Step 310. By regularly measuring the signal strength and attenuation using OTDR equipment, a fiber's performance evolution can be tracked. An increase in signal attenuation, or loss of power, often indicates that the fiber is degrading due to factors such as splicing issues, bending, or environmental effects. By comparing power data from tests conducted at different intervals, engineers can identify trends in the rate of degradation. Additionally, distance data helps pinpoint specific locations where problems are developing. By evaluating these trends, as discussed herein, engine 200 can predict the fiber's future performance, schedule maintenance or replacements proactively, and ensure the network's long-term reliability and efficiency.

According to some embodiments, the analysis in Step 304 and subsequent determination of the .DAT files can involve engine 200 implementing any type of known or to be known computational analysis technique, algorithm, mechanism or technology to perform the analysis of the. SOR files.

In some embodiments, engine 200 may execute and/or include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may leverage a large language model (LLM), whether known or to be known. A LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the sensor data, as discussed herein.

According to some embodiments, the AI/ML and LLM computational analysis algorithms implemented can be applied and/or executed in a time-based manner, in that collected sensor data for specific time periods can be allocated to such time periods so as to determine patterns of activity (or non-activity) according to a criteria. For example, engine 200 can execute a Bayesian determination for a predetermined time span, at preset and/or dynamically determined intervals (e.g., a 24 hour time span, every 8 hours, for example), so as to segment the day according to applicable patterns, which can be leveraged to determine, derive, extract or otherwise activities/non-activities in/around fiber optic assets.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 312, engine 200 can store the created. DAT files for each of the identified. SOR files in database 108. As discussed above, in some embodiments, database 108 can be a traditional database (e.g., a LUT, where the. DAT is stored in association with the stored .SOR file); and in some embodiments, database 108 can be a distributed ledger (e.g., blockchain).

In Step 314, engine 200 can compile and store a non-fungible token (NFT), which based on the .JSON and .DAT files (and/or the .SOR files), can be understood as an NFT with metadata. That is, the long term values, which can be used to predict how a fiber asset operates (e.g., as discussed in more detail below), as captured as part of the. DAT files, and the metadata from the .JSON files, can be combined to create an NFT file(s) that entails all an OTDRs records.

According to some embodiments, creating and storing an NFT on a blockchain based on .JSON and .DAT files involves several steps. In some embodiments, the NFT's metadata can be defined via the .JSON file, which includes essential information such as the token's name, description, and a link to its associated media or data. Next, in some embodiments, engine 200 can convert the. DAT file into a format suitable for inclusion in the NFT (e.g., depending on the data's nature, store it as a file on a decentralized storage platform like IPFS (InterPlanetary File System) and include a link to this file in the .JSON metadata-IPFS ensures the data remains accessible and immutable over time).

After preparing the metadata and data, engine 200 can mint the NFT by creating a smart contract on a blockchain platform. In some embodiments, the smart contract can include the. JSON metadata URL, and can manage the ownership and transfer of the NFT. The smart contract can be stored/deployed to the blockchain, which can assign a unique token identifier (ID) for the NFT. And, in some embodiments, the NFT, complete with its metadata and data references, can be stored on the blockchain (database 108), which ensures its uniqueness, ownership and provenance are securely recorded and verifiable, and, as provided below, allows the NFT to be bought, sold and/or traded in the digital marketplace. Indeed, as provided below with reference to Process 350 of FIG. 3B, such stored NFT can be utilized to predict and/or control a fiber assets operation, usage and/or implementation.

Turning to FIG. 3B, Process 350 provides example embodiments for utilizing an NFT and/or smart contract control, manage and/or operate functionality on/over the network. According to some embodiments, Steps 352 and 354 of Process 350 can be performed by identification module 202 of management engine 200; Step 356 can be performed by analysis module 204; Step 358 can be performed by determination module 206; and Step 360 can be performed by output module 206.

According to some embodiments, Process 350 begins with Step 352 where engine 200 can receive a request related to a fiber optic asset(s) and/or a requested service. In some embodiments, the request can correspond to a time, location, set of cables, a network event, and the like, or some combination thereof. For example, a third party entity may be requesting fiber optic asset data related to a seismic event at a location that occurred for a time period. In another example, an entity may be requesting predicted activity of a set of fiber optic assets for a predicted time period, which may be based on geographical and/or environmental conditions (e.g., past, present and/or prediction conditions). And, in yet another example, a customer is requesting 100 GBE from city A to city B in state C (and can the fiber assets along that path support such request, for example).

In some embodiments, the request can include information related to, but not limited to, an entity, location, time, event, geographical condition, environmental condition, technology, asset type, asset ID, and the like, or some combination thereof.

In Step 354, engine 200 can parse the request and identify information that can be utilized to retrieve stored information as it pertains to the request. For example, stored data in database 108, inclusive of the NFTs stored in Process 300 discussed supra, can be retrieved, where such data/NFTs can be related to the fiber optic assets identified in the request. Thus, for example, a search of a blockchain can be performed, whereby, in compliance with a corresponding smart contract, the NFT can be retrieved.

In Step 356, engine 200 can analyze the retrieved information based on the information included in the request. For example, the NFT for a set of fiber assets can be analyzed in view of a request for predicted seismic activity in the region. This, as provided herein, will enable the usage of the data in a manner that ensures the integrity of the fiber assets in the face of such a real-world event.

Accordingly, in Step 356, engine 200 can analyze the NFT (e.g., data included in the NFT, as discussed supra) based on the request. According to some embodiments, engine 200 can implement any type of known or to be known computational analysis technique, algorithm, mechanism or technology to perform such computational analysis, including the AI/ML and/or LLM technologies discussed above at least in relation to Step 310 in Process 300.

In Step 358, based on the analysis from Step 356, engine 200 can determine a prediction implementation based on the request. For example, engine 200 can execute an LLM with the NFT and request as input, whereby the LLM can output projected issues with a set of fiber assets, and potential steps/instructions for mitigating such issues. And, in another non-limiting example, fiber assets can be altered (e.g., lengthened or shortened) based on the output predictions. In some embodiments, the LLM may provide executable operations (e.g., instructions) that can be applied and/or implemented to, among other benefits, automate the mitigation of predicted issues, provide improvements and/or address specific network requests, and the like, in an automatic manner.

And, in Step 360, engine 200 can output information related to the prediction in line with the smart contract (associated with the NFT(s)). That is, according to some embodiments, an NFT representing a fiber optic asset can be analyzed using AI/ML or LLMs to assess its current status, performance data and/or potential usage. When a request is made (as in Step 352), AI/ML algorithms can process the NFT's metadata and associated data (e.g., stored in. JSON or. DAT files) to extract critical information such as network capacity, signal quality, and historical performance trends. The model can also analyze real-time network data, identifying potential issues like degradation or capacity bottlenecks.

Based on this analysis, the AI/ML or LLM can generate insights or recommendations for the requestor. For example, if the NFT analysis indicates the fiber network is operating at maximum capacity or experiencing signal degradation, the model might suggest limiting additional traffic, scheduling maintenance, or rerouting data through a different fiber path. On the other hand, if the analysis shows that the network is underutilized, it could recommend expanding usage or provisioning more services.

Thus, such insights can allow the requesting entity to make informed decisions about how to optimize, maintain, or scale the fiber network, ensuring efficient use of resources and preventing potential disruptions. Indeed, as discussed above, such insights can be compiled into operational steps that eliminate the need for a field engineer or network technician to perform the steps, as engine 200 can execute the instructions to mitigate any issue. Therefore, engine 200'soperations, via a model's output, can control an entity's access and/or management of a fiber network, thereby enhancing operational efficiency and reliability.

In some embodiments, such controls and/or outputs of the prediction model, and/or access to the NFT, can be based on executable functions of the smart contract, which can be "pay to play," in that purchase orders may need to be executed, which can be stored on the blockchain to provide an audit trail of the data accessed, analyzed and/or produced via Process 350.

Accordingly, conventional efforts put forth by telecom companies have fallen short in storing and analyzing vast amounts of fiber optic data, with limited visibility into the real-time condition of fiber assets. The disclosed systems and methods, as discussed above at least with reference to Processes 300 and 350, provide a computerized solution that leverages blockchain technology to securely store and manage such data, granting customers ownership and facilitating easy access for analysis. By enabling continuous monitoring, the disclosed framework's operation can support proactive maintenance and optimization of fiber assets. Additionally, the framework expands NaaS offerings, making Layer 1 solutions like ExaSwitch™ accessible to a broader customer base.

Figure 7:
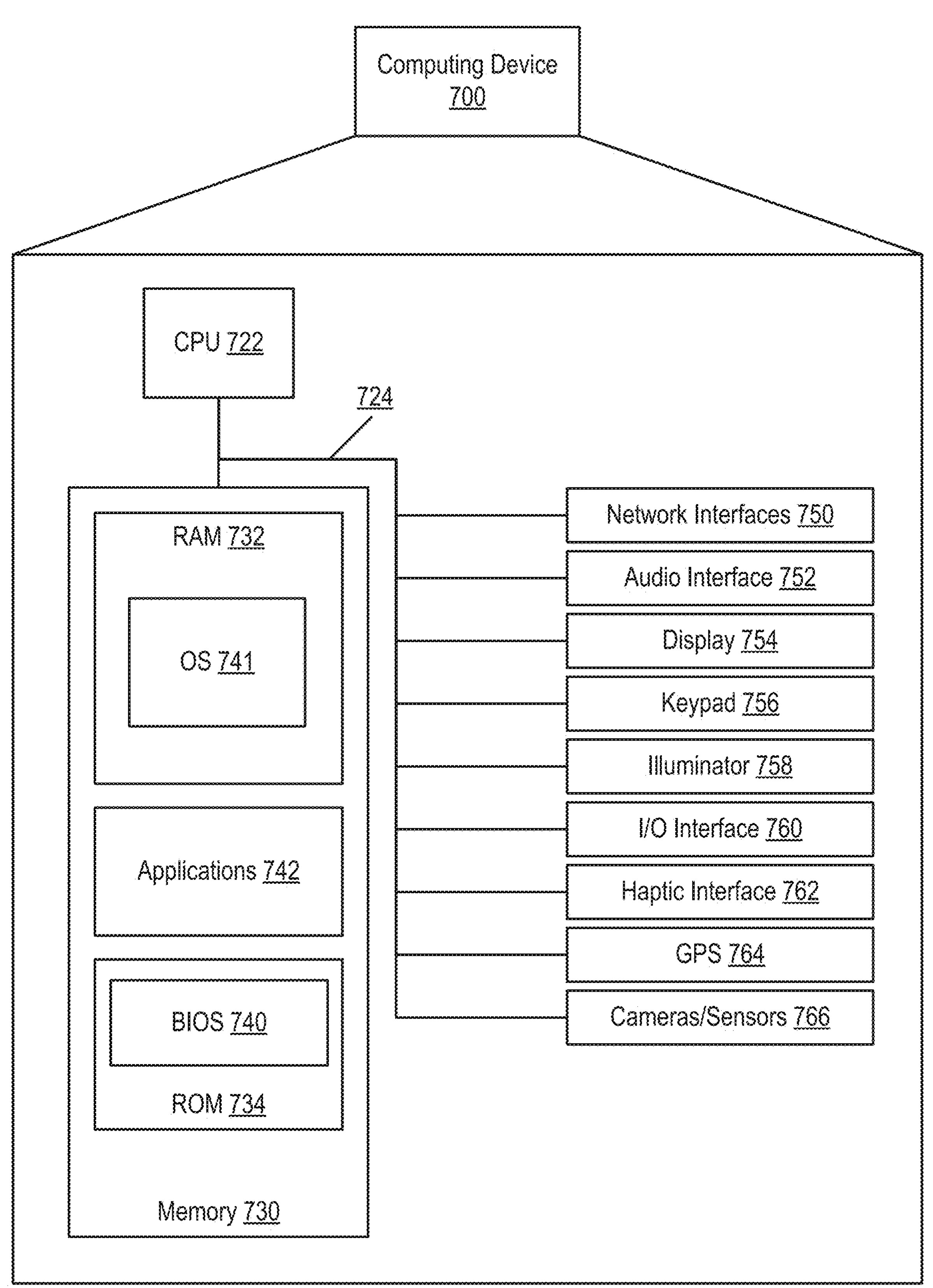
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS or the like, to further determine the physical location of client device 700 on the surface of the Earth. In one embodiment, however, Client device 700 may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying Optical Time-Domain Reflectometer (OTDR) data, the OTDR data corresponding to a set of assets associated with a fiber optic network;

analyzing the OTDR data, and determining, based on the analysis, a first set of files and a second set of files, the first set of files comprising metadata associated with the set of assets from the OTDR data, the second set of files comprising long term evaluations of the set of assets;

compiling, based on the first set of files and the second set of files, a non-fungible token (NFT); and storing, in a distributed ledger, the NFT.

2. The method of claim 1, further comprising:

receiving a request related to the NFT, the request comprising information related to a fiber asset within the set of assets and a service to be performed via the fiber optic network;

analyzing, via an artificial intelligence (AI) model, the NFT based on the request;

determining, based on the AI-based analysis, a prediction of implementation of the service related to the fiber asset; and outputting, in response to the request, the prediction in accordance with a smart contract associated with the NFT.

3. The method of claim 2, further comprising the AI model being a large language model (LLM).

4. The method of claim 2, further comprising the prediction corresponding to an output selected from a group consisting of: modification of the fiber asset, identification of an issue related to the fiber asset, mitigation of the issue and executable instructions for performance of the service.

5. The method of claim 2, further comprising:

updating a location of the distributed ledger based on the output.

6. The method of claim 1, further comprising the metadata comprising information selected from a group consisting of: fiber length, attenuation, event points and test parameters.

7. The method of claim 1, further comprising converting the OTDR data into the first set of files in a .JSON file format.

8. The method of claim 1, further comprising the long term evaluations of the set of assets being based on power and distance data associated with the set of assets.

9. The method of claim 1, further comprising converting the OTDR data into the second set of files in a .DAT file format.

10. The method of claim 1, further comprising the OTDR data being in .SOR format.

11. A system comprising:

a processor configured to:

identify Optical Time-Domain Reflectometer (OTDR) data, the OTDR data corresponding to a set of assets associated with a fiber optic network;

analyze the OTDR data, and determine, based on the analysis, a first set of files and a second set of files, the first set of files comprising metadata associated with the set of assets from the OTDR data, the second set of files comprising long term evaluations of the set of assets;

compile, based on the first set of files and the second set of files, a non-fungible token (NFT); and store, in a distributed ledger, the NFT.

12. The system of claim 11, wherein the processor is further configured to:

receive a request related to the NFT, the request comprising information related to a fiber asset within the set of assets and a service to be performed via the fiber optic network;

analyze, via an artificial intelligence (AI) model, the NFT based on the request;

determine, based on the AI-based analysis, a prediction of implementation of the service related to the fiber asset; and output, in response to the request, the prediction in accordance with a smart contract associated with the NFT.

13. The system of claim 12, wherein the processor is further configured, such that the prediction corresponds to an output selected from a group consisting of: modification of the fiber asset, identification of an issue related to the fiber asset, mitigation of the issue and executable instructions for performance of the service.

14. The system of claim 12, wherein the processor is further configured to:

update a location of the distributed ledger based on the output.

15. The system of claim 11, wherein the processor is further configured, such that:

the metadata comprising information selected from a group consisting of: fiber length, attenuation, event points and test parameters; and the long term evaluations of the set of assets being based on power and distance data associated with the set of assets.

16. A non-transitory computer-readable storage medium tangibly encoded with computer-executable instructions that when executed by a device, perform a method comprising:

identifying Optical Time-Domain Reflectometer (OTDR) data, the OTDR data corresponding to a set of assets associated with a fiber optic network;

analyzing the OTDR data, and determining, based on the analysis, a first set of files and a second set of files, the first set of files comprising metadata associated with the set of assets from the OTDR data, the second set of files comprising long term evaluations of the set of assets;

compiling, based on the first set of files and the second set of files, a non-fungible token (NFT); and storing, in a distributed ledger, the NFT.

17. The non-transitory computer-readable storage medium of claim 16, further comprising:

receiving a request related to the NFT, the request comprising information related to a fiber asset within the set of assets and a service to be performed via the fiber optic network;

analyzing, via an artificial intelligence (AI) model, the NFT based on the request;

determining, based on the AI-based analysis, a prediction of implementation of the service related to the fiber asset; and outputting, in response to the request, the prediction in accordance with a smart contract associated with the NFT.

18. The non-transitory computer-readable storage medium of claim 17, further comprising the prediction corresponding to an output selected from a group consisting of:

modification of the fiber asset, identification of an issue related to the fiber asset, mitigation of the issue and executable instructions for performance of the service.

19. The non-transitory computer-readable storage medium of claim 17, further comprising:

updating a location of the distributed ledger based on the output.

20. The non-transitory computer-readable storage medium of claim 16, further comprising:

the metadata comprising information selected from a group consisting of: fiber length, attenuation, event points and test parameters; and the long term evaluations of the set of assets being based on power and distance data associated with the set of assets.

* * * * *